United States Patent Office 3,309,095
Patented Mar. 14, 1967

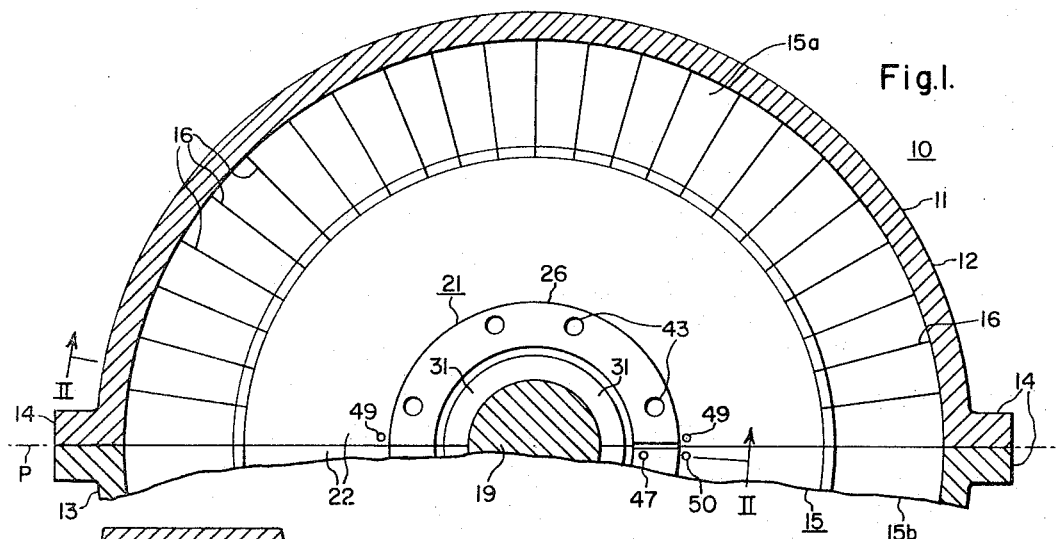
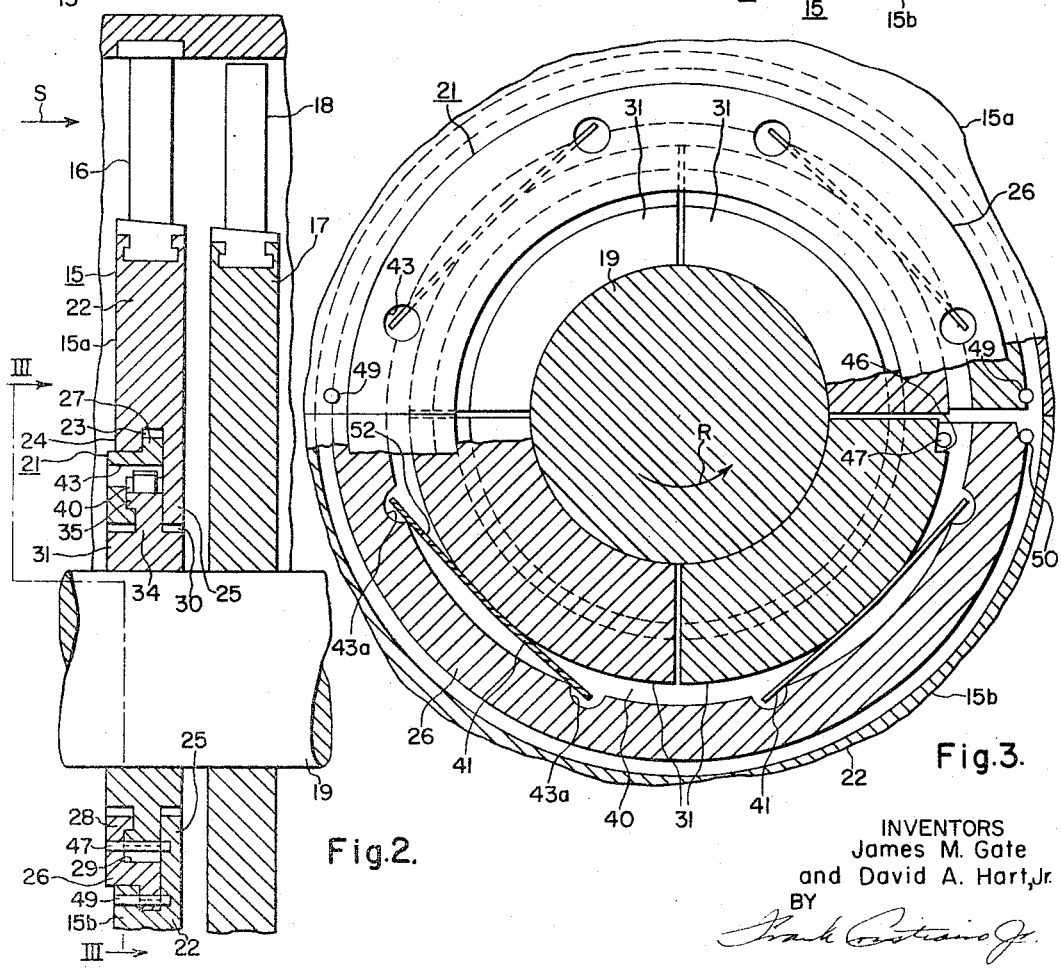

3,309,095
SEALING ARRANGEMENT FOR A ROTATABLE SHAFT
James M. Gate, Broomall, and David A. Hart, Jr., Marple Township, Springfield, Pa., assignors to Westinghouse Electric Corporation, East Pittsburgh, Pa., a corporation of Pennsylvania
Filed Mar. 11, 1964, Ser. No. 350,987
4 Claims. (Cl. 277—154)

This invention relates to sealing arrangements for rotatable shafts, and more particularly to such sealing arrangements in which the sealing ring is formed of a plurality of arcuate segments maintained in sealing relation with the shaft. Such sealing arrangements are employed, for example, in axial flow elastic fluid utilizing machines such as turbines and compressors to minimize leakage of elastic fluid past an annular bladed diaphragm structure along the shaft. Usually, the sealing ring is maintained in closely spaced relation with the shaft. However, it may be disposed in slidable engagement with the shaft, if desired.

Diaphragm structures are usually formed in two mating semi-circular halves for ease of assembly and service and the machine casing structure is also formed in two mating halves of semi-circular cross-section. The casing halves are formed in a manner to receive the associated diaphragm halves prior to assembly about the machine rotor. Hence, the seal structure is usually formed in segments and retained in the diaphragm halves.

It is an object of the invention to provide an improved sealing arrangement for a rotatable shaft wherein the sealing ring segments are retained in a simple manner by retaining means that is easily and relatively inexpensively manufactured.

It is a further object of the invention to provide an improved yet simplified arrangement for retaining a sealing ring structure in a pair of mating partition members, for example a divided diaphragm structure for an elastic fluid machine.

Briefly, in accordance with the invention, there is provided an annular array of arcuately segmental seal members disposed in encompassing relation with a rotatable shaft and retained in sealing relation with said shaft by retaining structure provided in an annular partition member having a central circular recess and divided into semi-circular halves.

The seal ring retaining structure comprises a retaining ring received in the circular recess and forming an annular keyway with the partition member. The seal members have radially outwardly extending keying portions received in the keyway and retained therein by the retaining ring. The seal members are biased in radially inward direction into sealing relation with the shaft by biasing members, such as flat springs, disposed in the keyway between the retaining ring and the seal ring segments.

The above and other objects are effected by the invention as will be apparent from the following description and claims taken in connection with the accompanying drawings, forming a part of this application, in which:

FIGURE 1 is a vertical sectional view showing the upper half of an axial-flow elastic fluid utilizing machine incorporating the invention;

FIG. 2 is an enlarged sectional view taken along line II—II of FIG. 1; and

FIG. 3 is a further enlarged partially sectional and partially elevational view taken on line III—III of FIG. 2.

Referring to the drawings in detail, there is shown in FIG. 1, a part of an axial flow elastic fluid utilizing machine, for example a turbine, generally designated 10, comprising an outer casing structure 11 of generally cylindrical shape and divided into an upper semi-cylindrical half 12 and a lower semi-cylindrical half 13 mating with each other. The upper and lower casing halves 12 and 13 may be joined together along a central horizontal plane P by suitable flanges 14 cooperatively associated with each other and joined to each other in any suitable manner (not shown).

As illustrated in FIG. 2, the turbine 10 is provided with a motive fluid expansion stage including a stationary vaned diaphragm structure 15 having an annular row of radially extending vanes 16 peripherally attached thereto and disposed immediately upstream (with respect to flow of elastic fluid S therethrough) of a rotatable blade row comprising a rotor disc 17, having an annular row of rotatable blades 18 supported thereon and extending radially outwardly therefrom into the motive fluid stream S. The rotor disc 17 is attached to a rotatable shaft 19 in a manner to be jointly rotatable therewith. Although a plurality of such stages (15, 17) may be employed in the turbine, only one such stage has been shown and will be described in connection with the invention, it being understood that each of the stages may be provided with the invention, if so desired.

Again referring to FIG. 2, the diaphragm structure 15 serves to support the stationary vanes 16 and to direct the motive fluid S to the rotating blades 18 in such a manner that the energy of the motive fluid is utilized in the rotating blades to drive the rotatable shaft 19, as well known in the art. In view of the above, it is desirable to minimize leakage flow of the motive fluid along the surface of the shaft 19 through the diaphragm structure 15. To minimize such leakage of the motive fluid, seal structure, generally designated 21, is employed.

In accordance with the invention, the diaphragm structure 15 is formed in two mating semi-circular halves comprising an upper half 15a and a lower half 15b divided along the horizontal plane P and extending coextensively with the upper casing half 12 and the lower casing half 13, respectively. The diaphragm halves 15a and 15b are substantially identical and, as shown in FIG. 2, include a pair of semi-circular disc portions or partitions 22 to which the vanes 16 are attached. The disc portions jointly define a centrally disposed circular recess 23 defined by a left-hand radially inwardly extending flange 24 and a right-hand radially inwardly extending flange 25. It will be noted that the two flanges are substantially parallel to each other and the right-hand flange 25 extends radially inwardly toward the shaft member 19 to a greater degree than the left-hand flange 24.

A retaining ring 26 is received in the recess 23 and is formed with a radially outwardly extending peripheral flange 27 and a radially inwardly extending peripheral flange 28. The peripheral flange 28 is of generally L-shape cross-section and jointly with the flange 25 of the disc portions 22 forms a circular keyway 29.

The disc portions 22 are further jointly provided with a central bore 30 of substantially larger diameter than that of the shaft 19 and centrally spaced therefrom and, to seal this space from leakage of fluid therepast, an annular array of arcuately segmental seal members 31 is disposed in encompassing relation with the shaft and received in the keyway 29. As illustrated, four segmental seal members 31 are provided which jointly substantially define a full circle and each of these seal segments or members is of substantially 90° angular extent. Accordingly, two of the seal members, as illustrated in FIG. 3, are disposed in the upper diaphragm half 15a while the other two are disposed in the lower diaphragm half 15b.

Each of the seal members 31 is provided with a radially outwardly extending keying portion 34 of arcuate shape extending into the keyway 29. The keying portion 34 is provided with a peripheral flange portion 35 extending in the same direction as the axis of the shaft 19, thereby retaining the seal member 31 against disengagement with the keyway. The keying portions 34 are of slightly less radial extent than the keyway 29 and jointly therewith define an annular space 40. Accordingly radial movement of the seal members 31 is permitted to a limited degree.

Within the space 40 a plurality of spring members 41, in this instance four, are disposed in cooperative association with the seal members 31 to bias the associated seal member into sealing relation with the shaft 19. As illustrated, the spring members 41 are formed of flat spring steel stock having their central or midsection disposed in tangential abutment with the associated seal member 31 and the opposite ends thereof in biased abutment with the internal surface of the retainer ring 26. To securely position the spring members 41 in operative association with the seal members, the retaining ring is provided with a plurality (in this instance four) pairs of apertures 43 so disposed and of such a size that in the region of the keyway 29 corresponding semi-circular notches or recesses 43a are formed, as illustrated in FIG. 3. These pairs of semi-circular recesses 43a are spaced in such manner that the ends of the spring members 41 are received therein and thereby secured against displacement in operation. The apertures 49 are further employed to provide a fluid communication between the motive fluid S on the left-hand side of the diaphragm structure 15 and the internal region of the keyway 29, thereby to balance the fluid pressure acting upon the seal members 31.

To prevent rotation of the seal members 31 during operation, at least one of the seal members 31, for example the seal member shown in the lower right-hand quadrant in FIG. 3, is provided with a notch or shoulder 46, and a pin 47 is driven through a suitable aperture in the lower diaphragm disc half 22 to provide a stop against rotation of the seal member array in the direction of rotation of the shaft 19, indicated by the arrow R.

During assembly, the lower diaphragm half 15b together with its associated half of the seal structure 21 is placed in the lower casing half 13 and the upper diaphragm half 15a together with its associated half of the seal structure 21 is placed in the inverter upper casing half 12. Then the rotor disc and shaft assembly 17, 19 is positioned in the lower casing half and the upper casing half is positioned on the lower casing half to complete the assembly. Accordingly, to maintain the upper half of the seal structure in the upper half of the diaphragm 15a, a pair of pins 49 are driven into the half disc portion 22 of the diaphragm half 15a (FIGS. 1 and 3) in the region adjacent the outer peripheral surface of the retaining ring 26. With this arrangement, when the upper half is inverted and superimposed upon the lower half to complete the assembly, as shown in FIG. 1, the components of the seal structure together with the diaphragm half 15a are maintained in the predisposed position.

Since the lower half of the diaphragm 15b is supported by the lower casing half 13, only one pin 50 need be provided to maintain the lower half of the seal structure in proper position and prevent rotation thereof during operation. The location of the pin 50 is substantially the same as that of the pin 49 in the upper half of the structure.

In addition to the above, if desired, each of the spring members 41 may be provided with a pair of apertures 52 disposed adjacent the end portions to facilitate removal thereof during servicing.

To service the above described seal structure the upper half of the machine is first removed from the unit thereby rendering the space 40 in the keyway 29 accessible to the serviceman.

The spring members 41 may then be removed individually by inserting a hook member into the space 40 and hooking one of the apertures 52 in the spring members 41, thereby to disengage the thus hooked spring member from the notches 43a in the retaining ring and permitting withdrawal therefrom. Upon removal of each spring member 41, the associated seal member is freely removable for repair or replacement.

In the event that the spring members are not provided with the apertures 52, the seal members may be removed with a circular sliding action by pushing them at one end.

The above described seal structure 21 is simple to manufacture and may be manufactured at reduced labor cost, since the disc members may be machined by simple machine tools. The retaining ring member serves to provide the locking arrangement for the segments and cooperates with the disc member to prevent disengagement of the seal members as well as the retaining ring when the machine is in assembled relationship as shown in FIG. 1 and FIG. 2. Further, since the retaining ring is separately formed, the contours of the retaining ring may be machined by simple machining techniques and tools. The separately formed retainer ring further permits facility in service and reduction in replacement cost of any of the components of the diaphragm 15 since each part may be individually replaced, if necessary, without the necessity of replacing the entire structure.

It will be noted that the upper and lower disc halves 22 of the diaphragm structure 15 are provided with substantially flat parallel side faces so machining of the recess 23 and flanges 24 and 25 for retaining the seal members 31 and retaining ring 26 is relatively simple.

Although only one embodiment of the invention has been described, it will be obvious to those skilled in the art that it is not so limited, but is susceptible of various other changes and modifications without departing from the spirit thereof.

We claim as our invention:

1. A sealing arrangement for a rotatable shaft comprising an annular array of arcuately segmental seal members disposed in encompassing relation with said shaft, an annular partition member disposed in encompassing relation with said shaft and divided diametrically into semi-circular halves, said partition member having a centrally disposed annular recess, a retaining ring having an annular flange portion received in said recess, said retaining ring being diametrically divided into semi-circular halves and jointly with said partition member defining an annular keyway, said seal members having radially outwardly extending keying portions received in said keyway, and means for biasing said seal members in radially inwardly direction into sealing relation with said shaft.

2. The structure recited in claim 1 in which the keyway is of larger radial extent than the keying portions, and the biasing means comprises a plurality of leaf springs disposed in the keyway and in tangentially biased abutment with the keying portions of the seal members.

3. The structure recited in claim 1 in which the keyway is of larger radial extent than the keying portions, and the biasing means comprises a plurality of leaf springs disposed in the keyway and maintained in tangentially biased abutment with the keying portions of the seal members by the retaining ring.

4. A sealing arrangement for a rotatable shaft comprising an annular array of arcuately segmental seal members disposed in encompassing relation with said shaft, an annular partition member disposed in encompassing relation with said shaft and divided diametrically into semi-circular halves, said partition member having a centrally disposed annular recess, a retaining ring having an annular flange portion received in said recess, said retaining ring being diametrically divided into semi-circular halves and jointly with said partition member defining an annular keyway, said seal members having radially outwardly extending keying portions received in said keyway, leaf springs disposed in said keyway for biasing said seal members in radially inwardly direction into sealing relation with said shaft, said retaining ring having a plurality of notches communicating with said keyway, and said leaf springs being retained at their ends by said notches in tangential abutment with said seal members.

References Cited by the Examiner
UNITED STATES PATENTS

| | | | |
|---|---|---|---|
| 647,313 | 4/1900 | Mitchell | 277—45 |
| 2,117,986 | 5/1938 | Robertson | 277—160 |
| 2,631,906 | 3/1953 | Brock | 277—205 X |
| 2,888,286 | 5/1959 | Scheffler et al. | 277—154 X |

FOREIGN PATENTS 1,003,674   3/1957   Germany.

LAVERNE D. GEIGER, *Primary Examiner.*

J. S. MEDNICK, *Assistant Examiner.*